(No Model.)
R. STEPHENS.
COVER FOR FRUIT BASKETS.
No. 311,211. Patented Jan. 27, 1885.
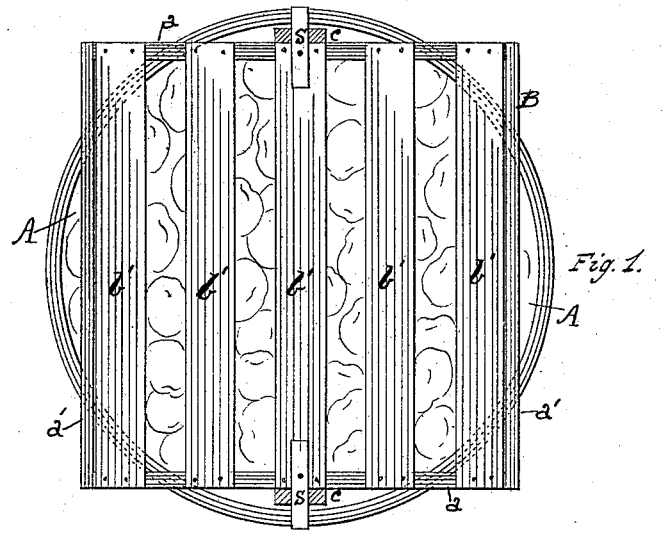
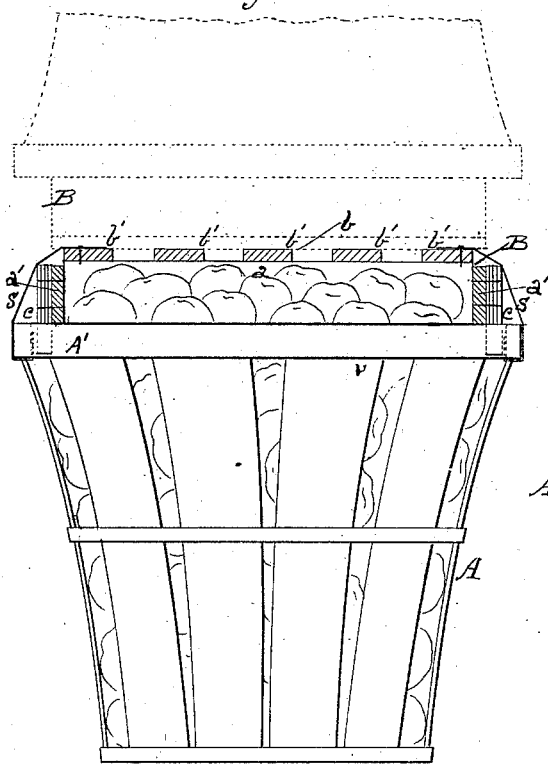
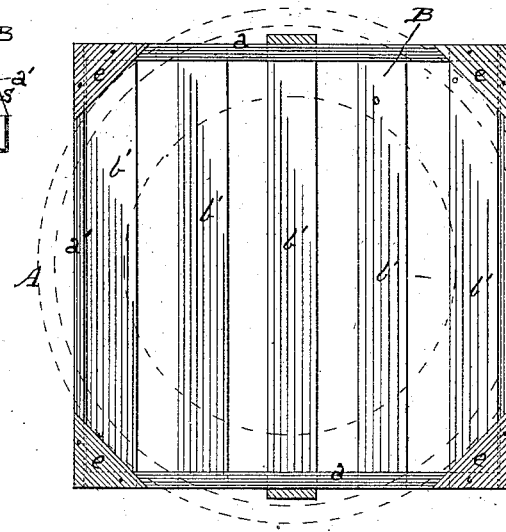
Witnesses:
Alex Selkirk Jr.
Richard Stephens
Inventor.

UNITED STATES PATENT OFFICE.

RICHARD STEPHENS, OF ALBANY, NEW YORK.

COVER FOR FRUIT-BASKETS.

SPECIFICATION forming part of Letters Patent No. 311,211, dated January 27, 1885.

Application filed October 4, 1884. (No model.)

*To all whom it may concern:*

Be it known that I, RICHARD STEPHENS, a citizen of the United States, residing in the city and county of Albany, and State of New York, have invented a new Cover for Fruit-Baskets, of which the following is a specification.

My invention relates to covers for baskets for fruits, such as peaches, plums, &c.; and it consists of an open-work cover constructed substantially as hereinafter particularly described, and specifically set forth in the claims.

The objects of my invention are, primarily, to produce a cover for fruit-baskets which will be so unyielding as to safely support one or more baskets, so that baskets of fruit may be stored on floors or on the sidewalk and in cars or boats in tiers several baskets high, and allow the basket to be heaped with fruit above its rim, with the fruit exposed to view, so as to be readily inspected without removal of the cover, while at the same time the cover can be readily applied and secured to the basket, and a portion of this cover be employed as a handle for carrying the basket; and, secondly, to provide a specific form of fruit-basket cover which will be cheaply constructed of wood and readily applied to fruit-baskets with great advantage to the grower, carrier, dealer, and consumer; and, further, to so combine with a fruit-basket this improved cover that the fruit will be fully protected and not liable to be bruised by pressure on the top of the same when several baskets provided with like covers are piled up in tiers, and the basket be readily carried as by a handle. I attain these objects by the means illustrated in the accompanying drawings, forming a part of this specification, in which—

Figure 1 is a plan view of my improved cover applied to a fruit-basket. Fig. 2 is a side elevation of a fruit-basket with the cover shown in section, and Fig. 3 is a view of the cover from its lower side.

The same letters of reference refer to like parts throughout the several views.

A is a fruit-basket, which can be made with any known form of construction, and B is the cover. This cover is made of square form, and is composed of side pieces, $a\ a$ and $a'\ a'$, and open-work top, which top is shown to be formed of slats $b'\ b'$, arranged at intervals apart, and extending from one side piece to the other opposite one, as from $a$ to $a$. These top slats, $b'$, I prefer to use in odd numbers— as three, five, or seven—preference being given to the use of five slats, for reason of economy in construction. The middle slat of the number is so firmly secured to side pieces, $a\ a$, as to make said piece to be in effect a strong and permanent handle, from which the basket will be balanced when lifted. The side pieces, $a\ a$, are preferably made with vertical extension of width of about two inches, while that of the side pieces, $a'\ a'$, may be made with a less depth—say as that of one and one-half inch— if preferred. The top slats, $b'$, are extended in direction parallel to side slats, $a'$, with the outermost ones nearly approaching the line of the vertical plane of the inner side surface of said side pieces, so that there is produced between these side pieces and outer top slats a space. Secured to two opposite side pieces from their outer sides, and at about the middle of their length, are pieces $c\ c$, which project downward past the lower edges of said side pieces about three-quarters of an inch, more or less. These downwardly-projected pieces are of such thickness and width as will permit them to be received within the circumference of the open end of the basket. These pieces $c$ operate in their engagement with the basket at opposite points as guards to hold the cover from shifting off from the open end of the basket. The corners formed by the side pieces, $a\ a'$, are shown to be strengthened by corner tie-pieces, $e\ e$, nailed to the lower edges of said side pieces. These corner tie-pieces are so arranged apart that their inner edges will permit the reception of the outer circumference of the upper end of the basket, as indicated in Fig. 3.

S S are tie-pieces, which are made of metal, and preferably of a narrow strip of sheet tin or iron, having their lower ends bent up in a hook-like form, as indicated by dotted lines in Fig. 2, for engagement with the rim-hoop A' of the basket at any of the openings between the staves of the same. The upper ends of these tie-pieces are secured to the cover by nails from either side of the cover, as shown in Figs. 1 and 3. If preferred, wire or other tie-pieces may be employed, and when applied so as to securely hold the cover down on the upper end of the basket the basket can be safely lifted and carried by the middle one of the top slats of the cover.

By my above-described improvements I am enabled to produce at small cost a durable cover having a ventilated chamber-room, which will operate to supplement the chamber-room of the basket it is applied to in a vertical direction, so as to allow the fruit in the basket to be heaped up to a greater extent than it can be with canvas covers or covers having nettings stretched within a hoop-form rim, as heretofore. Its unyielding open-work top prevents the fruit from being handled. This cover also operates as a platform to support another basket, and enables the shipper and dealer to arrange the baskets in rows and in tiers one on the other in store-rooms, or on the sidewalk, or in wagons, and also enables shippers to dispense with the use of platforms and scaffolding in loading cars or boats with fruit and reduce the expense of transportation of fruit.

Having described my invention, what I claim, and desire to secure by Letters Patent, is—

1. A fruit-basket cover having a slatted top, and side pieces capable of resting on the rim of the basket, and corner-pieces $e$, holding the cover to its square form, and capable of engaging with the outer circumference of the rim of the basket for holding the cover from shifting horizontally with relation to the basket, all substantially as and for the purposes set forth.

2. A fruit-basket cover having a slatted top, and side rim-pieces capable of resting on the rim of the basket, and downwardly-projecting pieces secured to the side rim-pieces for holding the cover from shifting horizontally with relation to the basket, and corner tie-pieces to hold the cover to its square form, and capable of engaging with the outer circumference of the rim of the basket, all substantially as and for the purposes set forth.

RICHARD STEPHENS.

Witnesses:
 ALEX. SELKIRK, Jr.,
 CHARLES SELKIRK.